(12) United States Patent
Chen et al.

(10) Patent No.: US 11,800,201 B2
(45) Date of Patent: Oct. 24, 2023

(54) METHOD AND APPARATUS FOR OUTPUTTING INFORMATION

(71) Applicant: BEIJING BYTEDANCE NETWORK TECHNOLOGY CO., LTD., Beijing (CN)

(72) Inventors: Dawei Chen, Beijing (CN); Bao Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 230 days.

(21) Appl. No.: 16/968,183

(22) PCT Filed: Nov. 16, 2018

(86) PCT No.: PCT/CN2018/115948
§ 371 (c)(1),
(2) Date: Aug. 7, 2020

(87) PCT Pub. No.: WO2020/042375
PCT Pub. Date: Mar. 5, 2020

(65) Prior Publication Data
US 2021/0377628 A1 Dec. 2, 2021

(30) Foreign Application Priority Data
Aug. 31, 2018 (CN) .......................... 201811012795.2

(51) Int. Cl.
*H04N 7/16* (2011.01)
*H04N 21/854* (2011.01)
(Continued)

(52) U.S. Cl.
CPC .......... *H04N 21/854* (2013.01); *G06F 21/31* (2013.01); *G06N 5/02* (2013.01); *H04N 21/84* (2013.01)

(58) Field of Classification Search
CPC .... H04N 21/854; H04N 21/84; H04N 21/235; H04N 21/232; H04N 21/233;
(Continued)

(56) References Cited

U.S. PATENT DOCUMENTS 9,961,155 B1 * 5/2018 Chan .................. G06F 21/6218
10,949,434 B1 * 3/2021 Tirupattur Saravanan ..................
G06Q 50/01
(Continued)

FOREIGN PATENT DOCUMENTS

CN 102695118 A 9/2012
CN 104462508 A 3/2015
(Continued)

OTHER PUBLICATIONS

International Patent Application No. PCT/CN2018/115948; Int'l Search Report; dated May 30, 2019; 2 pages.

*Primary Examiner* — Annan Q Shang
(74) *Attorney, Agent, or Firm* — BakerHostetler

(57) ABSTRACT

A method and an apparatus for outputting information are provided. A specific embodiment of the method includes: determining an entity characterizing a target video from a pre-created knowledge graph; acquiring authority owner information for characterizing an authority owner of the target video from attribute information of the entity; determining whether the authority owner is a target authority owner or not based on the authority owner information; and in response to determining that the authority owner is a target authority owner, determining at least one entity associated with the authority owner information from entities for characterizing videos in the knowledge graph, and generating and outputting related information of each entity in the at least one entity. According to the embodiment, based on the authority owner information, entities associated with the (Continued)

authority owner information can be accurately obtained, and the pertinence of information shown for the user can be improved.

20 Claims, 5 Drawing Sheets

(51) Int. Cl.
  *G06F 21/31* (2013.01)
  *G06N 5/02* (2023.01)
  *H04N 21/84* (2011.01)
(58) Field of Classification Search
  CPC ............ H04N 21/439; H04N 21/4722; H04N 21/4884; H04N 21/234336; H04N 21/6581; H04N 21/6582; H04N 21/8133; G06F 21/31; G06F 21/6218; G06F 16/735; G06F 16/738; G06F 16/78; G06N 5/02; G10L 15/26; G10L 21/10; H04L 67/1097
  See application file for complete search history.

(56) References Cited

U.S. PATENT DOCUMENTS

| | | | | |
|---|---|---|---|---|
| 2004/0117831 | A1* | 6/2004 | Ellis | H04N 21/4755 348/E7.071 |
| 2007/0118758 | A1* | 5/2007 | Takahashi | G06F 21/305 713/186 |
| 2009/0133051 | A1* | 5/2009 | Hildreth | H04N 21/42204 725/28 |
| 2009/0144202 | A1* | 6/2009 | Hurry | H04N 21/47815 705/73 |
| 2012/0036018 | A1* | 2/2012 | Feliciano | G06Q 30/02 709/224 |
| 2013/0332543 | A1 | 12/2013 | Shin et al. | |
| 2014/0032924 | A1* | 1/2014 | Durham | G06F 21/10 713/186 |
| 2014/0147020 | A1* | 5/2014 | Baldwin | H04N 21/44008 382/118 |
| 2014/0328570 | A1* | 11/2014 | Cheng | H04N 21/233 386/241 |
| 2015/0161362 | A1* | 6/2015 | Clift | G06F 21/10 713/171 |
| 2015/0221316 | A1* | 8/2015 | Mufti | G10L 19/018 700/94 |
| 2017/0330597 | A1* | 11/2017 | Krejci | H04N 21/84 |
| 2018/0253539 | A1* | 9/2018 | Minter | G06F 21/64 |
| 2019/0147185 | A1* | 5/2019 | Cai | G06V 40/166 726/30 |

FOREIGN PATENT DOCUMENTS

| | | |
|---|---|---|
| CN | 106095858 A | 11/2016 |
| CN | 106776862 A | 5/2017 |
| CN | 107466403 A | 12/2017 |
| CN | 107688614 A | 2/2018 |
| CN | 107911749 A | 4/2018 |

* cited by examiner

METHOD AND APPARATUS FOR OUTPUTTING INFORMATION

CROSS-REFERENCE TO RELATED APPLICATION

The disclosure is the U.S. National Stage of International Application No. PCT/CN2018/115948, filed on Nov. 16, 2018, which claims the priority benefit to Chinese Patent Application No. 201811012795.2, filed on Aug. 31, 2018, by Beijing ByteDance Network Technology Co., Ltd., and titled "METHOD AND APPARATUS FOR OUTPUTTING INFORMATION," the entire contents of which are incorporated herein by reference.

TECHNICAL FIELD

The embodiments of the present application relate to the computer technology, more particularly to a method and apparatus for outputting information.

BACKGROUND

A Knowledge Graph is a knowledge base called semantic network, i.e. a knowledge base with a directed graph structure in which nodes of the graph represent entities or concepts and edges of the graph represent various semantic relations between entities/concepts. The knowledge graph is applicable to various fields such as information search, information recommendation and the like. With the knowledge graph, other entities associated with an entity characterizing a certain piece of information can be obtained, so that other information associated with the certain information can be accurately obtained.

SUMMARY

Embodiments of the application provide a method and apparatus for outputting information.

On a first aspect, an embodiment of the application provides a method for outputting information, comprising: determining an entity characterizing a target video from a pre-created knowledge graph; acquiring an authority owner information for characterizing an authority owner of the target video from an attribute information of the entity; determining whether the authority owner is a target authority owner or not based on the authority owner information; and in response to determining that the authority owner is the target authority owner, determining at least one entity associated with the authority owner information from entities for characterizing videos in the knowledge graph, and generating and outputting a related information of the entity in the at least one entity.

In some embodiments of the application, wherein the determining whether the authority owner is a target authority owner or not based on the authority owner information, comprises: determining whether the authority owner information is included in a pre-created authority owner information set or not; and in response to determining the authority owner information is included in the pre-created authority owner information set, determining that the authority owner is the target authority owner.

In some embodiments of the application, wherein the generating and outputting a related information of the entity in the at least one entity, comprises: for the entity in the at least one entity, acquiring a view count data of a video characterized by the entity, wherein the view count data is a numerical value; and in response to determining that the acquired view count data is greater than or equal to a preset view count threshold, generating a first prompt information, and generating and outputting the related information, containing the first prompt information, of the entity.

In some embodiments of the application, wherein after the acquiring a view count data of a video characterized by the entity, the method further comprises: in response to determining that the acquired view count data is smaller than the preset view count threshold, generating a second prompt information, and generating and outputting the related information, containing the second prompt information, of the entity.

In some embodiments of the application, wherein the related information of the entity comprises at least one of: a title of the video characterized by the entity, a popularity data of the video characterized by the entity, and an authority cost information of the video characterized by the entity.

In some embodiments of the application, wherein the popularity data comprises at least one of: a view count data of the video characterized by the entity, a follower count data of the video characterized by the entity, and a comment count data of the video characterized by the entity.

In some embodiments of the application, wherein after the generating and outputting a related information of the entity in the at least one entity, the method further comprises: for the entity in the at least one entity, in response to receiving a removing operation instruction for the entity, deleting a video information of the video characterized by the entity from a target page, wherein the target page is used for showing the video information of the video characterized by the entity, and the removing operation instruction is generated by performing a removing operation through a target user terminal on the video characterized by the entity in the target page.

On a second aspect, an embodiment of the application further provides an apparatus for outputting information, comprising: a first determination unit, configured to determine an entity characterizing a target video from a pre-created knowledge graph; an acquisition unit, configured to acquire an authority owner information for characterizing an authority owner of the target video from an attribute information of the entity; a second determination unit, configured to determine whether the authority owner is a target authority owner or not based on the authority owner information; and an output unit, configured to in response to determining that the authority owner is the target authority owner, determine at least one entity associated with the authority owner information from entities for characterizing videos in the knowledge graph, and generating and outputting related information of each entity in the at least one entity.

In some embodiments of the application, wherein the second determination unit comprises: a first determination module, configured to determine whether the authority owner information is included in a pre-created authority owner information set or not; and a second determination module, configured to in response to determining the authority owner information is included in the pre-created authority owner information set, determine that the authority owner is the target authority owner.

In some embodiments of the application, wherein the output unit is further configured to: for the entity in the at least one entity, acquire view count data of a video characterized by the entity, wherein the view count data is a numerical value; and in response to determining that the acquired view count data is greater than or equal to a preset view count threshold, generate a first prompt information, and generate and output the related information, containing the first prompt information, of the entity.

In some embodiments of the application, wherein the output unit is further configured to: in response to determining that the acquired view count data is smaller than the preset view count threshold, generate a second prompt information, and generate and output the related information, containing the second prompt information, of the entity.

In some embodiments of the application, wherein the related information of the entity comprises at least one of: a title of the video characterized by the entity, a popularity data of the video characterized by the entity, and an authority cost information of the video characterized by the entity.

In some embodiments of the application, wherein, the popularity data comprises at least one of: a view count data of the video characterized by the entity, a follower count data of the video characterized by the entity, and a comment count data of the video characterized by the entity.

In some embodiments of the application, wherein, the apparatus further comprises: a delete unit, configured to for the entity in the at least one entity, in response to receiving a removing operation instruction for the entity, delete a video information of the video characterized by the entity from a target page, wherein the target page is used for showing the video information of the video characterized by the entity, and the removing operation instruction is generated by performing a removing operation through a target user terminal on the video characterized by the entity in the target page.

On a third aspect, an embodiment of the application provides a server, comprising: one or more processors; and a memory, with one or more programs stored therein, the one or more processors are configured to implement a method for outputting information according to any one of embodiment of the application when the one or more programs are executed.

On a fourth aspect, an embodiment of the application further provides a computer readable medium, storing a computer program, configured to perform a method for outputting information according to any one of embodiment of the application when the program is executed by a processor.

According to the method and apparatus for outputting information provided by the embodiments of the present application, an entity characterizing a target video is determined from a pre-created knowledge graph, then a authority owner information for characterizing an authority owner of the target video is determined, thereafter, whether the authority owner is a target authority owner or not is determined, and if the authority owner is the target authority owner, at least one entity associated with the authority owner information is determined from the knowledge graph, and a related information of the entity in the at least one entity is generate and output, so that, the entity associated with the authority owner information can be accurately obtained based on the authority owner information, and the pertinence of information shown for the user can be improved.

BRIEF DESCRIPTION OF THE DRAWINGS

Other features, objects, and advantages of the present application will become apparent from the following detailed description of non-limiting embodiments with reference to the accompanying drawings, in which.

DETAILED DESCRIPTION OF THE EMBODIMENTS

The present application will be described in further detail below with reference to the accompanying drawings and embodiments. It is to be understood that the specific embodiments described herein are merely illustrative of the relevant application and are not limiting of the application. It is also to be noted that for ease of description, only those portions that are pertinent to the relevant application are shown in the accompanying drawings.

It should be noted that the embodiments and features in the embodiments of the present application may be combined with one another without conflict. The present application will now be described in detail in conjunction with the embodiments with reference to the accompanying drawings.

Figure 1:
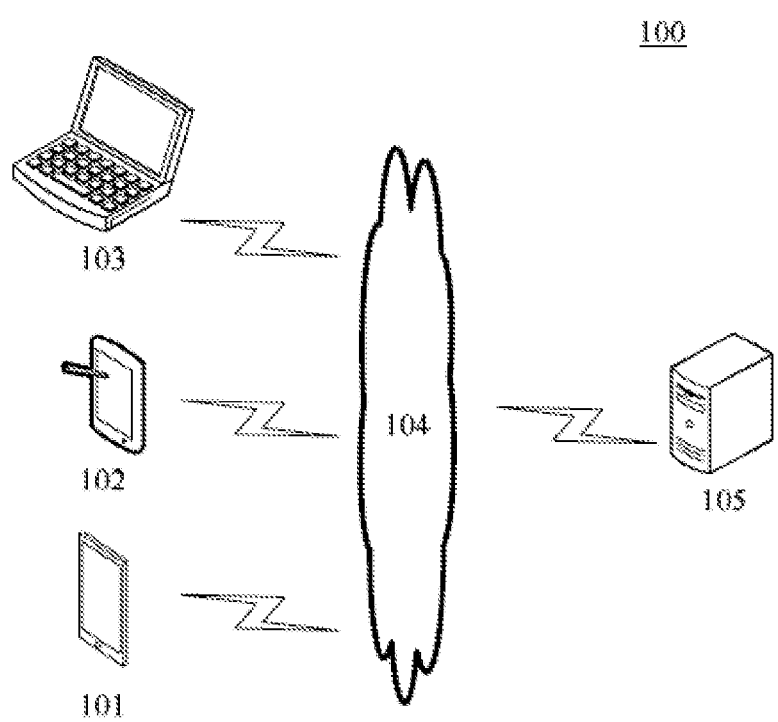
FIG. 1 is a diagram illustrating an exemplary system architecture in which an embodiment of the present application may be applied.

FIG. 1 shows an exemplary system architecture 100 to which the method for outputting information or the apparatus for outputting information of the embodiments of the present application can be applied.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

A user can use the terminal equipment 101, 102 and 103 to interact with the server 105 via the network 104 to receive or send messages. Various client applications, such as video playing applications, web browser applications, search applications, instant messaging tools and social platform applications, can be installed in the terminal equipment 101, 102 and 103.

The terminal equipment 101, 102 and 103 may be hardware or software. When being hardware, the terminal equipment 101, 102 and 103 may be various kinds of electronic equipment, including but not limited to smart phones, tablet personal computers, e-book readers, MP3 player (Moving Picture Experts Group Audio Layer III, motion picture expert compression standard audio layer 3), MP4 (Moving Picture Experts Group Audio Layer IV, motion picture expert compression standard audio layer 4) player, laptop portable computers, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be a server that provides various services, such as a back-end information processing server that supports the related information of entities displayed on the terminal devices 101, 102, and 103. The background information processing server may process the entities included in the pre-created knowledge graph and obtain the processing result (for example, the related information of the entity in the at least one entity associated with the authority owner information).

It should be noted that the method for outputting information provided by the embodiments of the application is generally executed by the server 105, and accordingly, the apparatus for outputting information is generally provided in the server 105.

It should be noted that the server 105 may be hardware or software. When being hardware, the server 105 may be implemented as a distributed server cluster including a plurality of servers, and may also be implemented as the single server. When being software, the server 105 may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
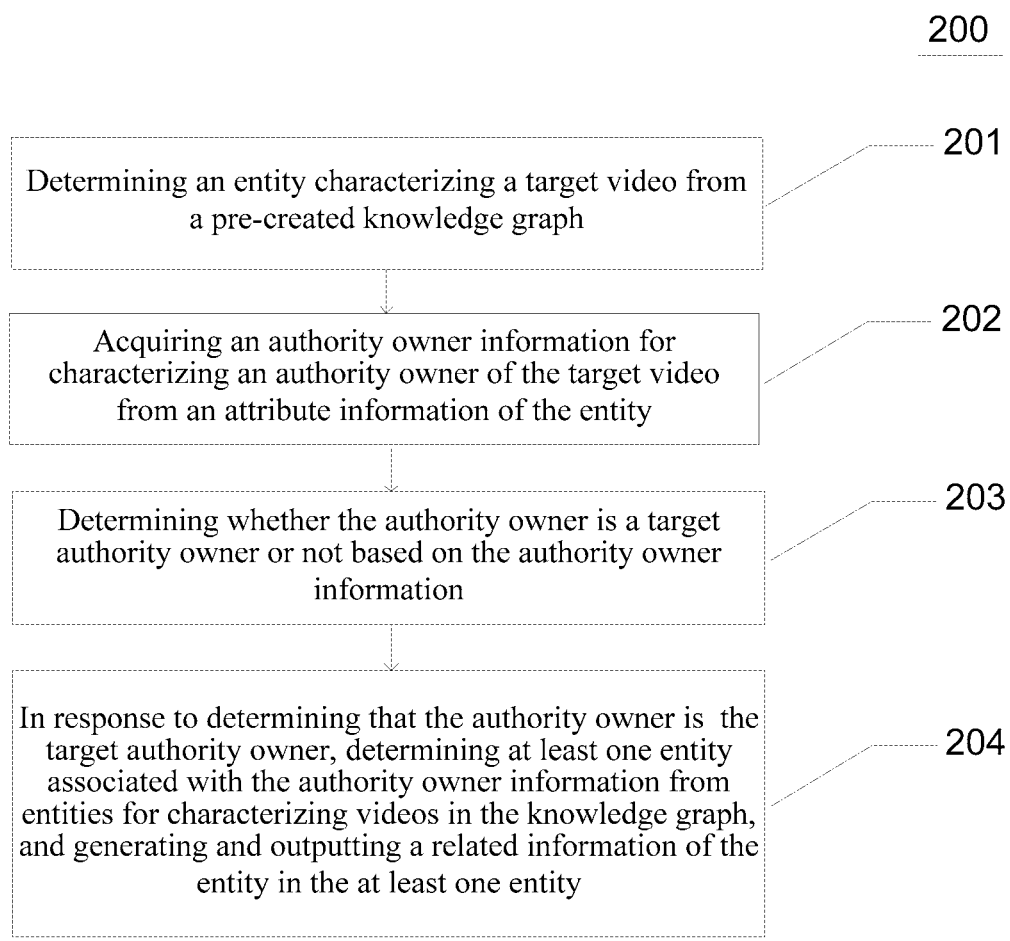
FIG. 2 is a flowchart of an embodiment of a method for outputting information according to an embodiment of the present application.

Still referring to FIG. 2, a process 200 of an embodiment of a method for outputting information according to the present application is shown. The method for outputting information includes the following steps:

Step 201, an entity characterizing a target video is determined from a pre-created knowledge graph.

In this embodiment, an executive subject of the method for outputting information (e.g., the server shown in FIG. 1,) can determine an entity characterizing a target video from a pre-created knowledge graph. Wherein, the target video may be a video specified by a technician in advance. The pre-created knowledge graph may be stored in the executive subject or in other electronic devices communicatively connected with the executive subject. In general, an entity in the knowledge graph may be used to characterize an object or concept (e.g., to characterize a person, location, time, information, etc.). The form of the entity may include at least one of the following: numbers, words, symbols, etc. In this embodiment, the knowledge graph may include entities for characterizing videos. As an example, a pre-created entity for characterizing a video may be "v-abc", wherein "v" indicates that the entity is used for characterizing a video, and "abc" is an identifier for characterizing the video. In addition, the knowledge graph of this embodiment may further include entities for characterizing other objects or concepts than videos. For example, a pre-created entity for characterizing a person may be "p-xyz", wherein "p" indicates that the entity is used for characterizing a person, and "xyz" is an identifier for characterizing the person.

The entity for characterizing a video described above may have a corresponding attribute information. The attribute information may be information related to the video characterized by the entity, and may include, but not limited to, at least one of: video-related person (e.g., a producer, an actor, a director, etc. of the video) information, video-related time (e.g., a release time, a shooting time, etc.) information, video source information (e.g., a play address of the video, a name of a website at which the video is located, etc.), and other information related with the content of the video (e.g., a profile, a still, a poster picture, etc.). In general, in a knowledge graph, a correspondence between an entity and attribute information may be represented by a data structure in the form of a triplet, i.e. "entity-attribute-attribute value", wherein the attribute information of the entity may include the above-mentioned attribute-attribute value. For example, a triplet may be "abc123-name-XXX", wherein "abc123" is an entity for characterizing a movie "XXX", "name" is an attribute, and "XXX" is an attribute value.

In this embodiment, the executive subject may determine the target video information from the above-mentioned knowledge graph in various ways. As an example, the executive subject may match a search term (e.g. a name, a type, a release time, etc. of the target video) related to the target video input by a technician with text information included in the attribute information of the entity characterizing a video, and determine an entity corresponding to text information including the search term to be the target entity. Alternatively, the entity may have identification information, and the executive subject may determine an entity characterizing the target video based on the identification information of an entity characterizing the target video specified by the technician.

Step 202, an authority owner information for characterizing an authority owner of the target video is acquired from attribute information of the entity.

In this embodiment, the executive subject may acquire the authority owner information for characterizing the authority owner of the target video from the attribute information of the entity determined in step 201. Wherein, the authority owner may be a unit or person owning a certain authority of the target video. The authority owner information may be used for characterizing the authority owner, and the form of the authority owner information may include, but not limited to, at least one of: characters, numbers, symbols, etc. For example, the authority owner information may be a name or a code of the authority owner.

In this embodiment, each piece of information included in the attribute information may have a corresponding identifier or number, and the executive subject may acquire the authority owner information from the attribute information of the entity according to the identifier or number characterizing the authority owner information.

Step 203, whether the authority owner is the target authority owner or not is determined based on the authority owner information.

In this embodiment, the executive subject may determine whether the authority owner is the target authority owner or not based on the authority owner information obtained in step 202. As an example, the executive subject may match the acquired authority owner information with previously acquired target authority owner information characterizing the target authority owner, and if the acquired authority owner information is identical to the target authority owner information, it is determined that the authority owner characterized by the acquired authority owner information is the target authority owner.

Optionally, the target authority owner may be an authority owner that has not been authorized (e.g., authorized for broadcasting, etc.). The authority owner information acquired by the executive subject may further include an authorization information for characterizing whether the authority owner is authorized. As an example, an authorization information of "1" indicates that the owner of the video characterized by the entity has been authorized as an authority owner, and an authorization information of "0" indicates that the owner of the video characterized by the entity has not been authorized as an authority owner. The executive subject may determine whether the authorization information included in the acquired authority owner information indicates that the owner of the video has been authorized as an authority owner, and if so, determine that the authority owner is a target authority owner.

In some optional implementations of this embodiment, the executive subject may determine whether the authority owner is the target authority owner according to the following steps:

firstly, whether the authority owner information is included in a pre-created authority owner information set or not is determined. The authority owner information set may be pre-stored in the executive subject or in an electronic device communicatively connected with the executive subject. As an example, an authority owner characterized by an authority owner information in the authority owner information set may be an authority owner that has not been authorized.

Then, in response to determining that the acquired authority owner information is included in the authority owner information set, it is determined that the authority owner is the target authority owner.

Step 204, in response to determining that the authority owner is the target authority owner, at least one entity associated with the authority owner information is determined from entities for characterizing videos in the knowledge graph, and a related information of the entity in the at least one entity is generated and output.

In this embodiment, the executive subject may, in response to determining that the authority owner is the target authority owner, determine at least one entity associated with the acquired authority owner information from entities for characterizing videos in the knowledge graph. As an example, the entity associated with the acquired authority owner information may be an entity whose corresponding attribute information includes the acquired authority owner information, and the executive subject may determine the attribute information including the acquired authority owner information from the attribute information of each entity characterizing a video, thereby determining at least one entity associated with the acquired authority owner information.

As another example, the entity in the knowledge graph described above may include authority owner entities characterizing authority owners which may establish relations with other entities via a data structure in the form of a triplet. For example, a triplet is "entity A-authority owner-entity B", wherein "entity A" is used for characterizing a video, "entity B" is used for characterizing an authority owner, and "authority owner" is used for characterizing a relation between the entity A and the entity B that: the authority owner characterized by the entity B is an authority owner of the video characterized by the entity A. The attribute information of the authority owner entity may include the authority owner information. The executive subject may determine an entity, from entities for characterizing videos in the knowledge graph, associated with the authority owner entity corresponding to the acquired authority owner information to be an entity associated with the authority owner information.

Then, the executive subject may generate the related information of the entity in the determined at least one entity and output the respective related information. Wherein, the related information may be information included in the attribute information of the entity or other information related to the entity (e.g. pre-acquired users' comments and ratings on the video characterized by the entity). As an example, the attribute information may include various types of sub information, which may have corresponding identifiers or serial numbers to distinct categories of the sub information. The executive subject may extract sub information of a preset category from the attribute information as related information.

Optionally, the above-mentioned executive subject may output the related information of the entity in various ways. For example, display the related information of the entity on a display connected to the executive subject, or output the related information of the entity to a terminal device (e.g. the terminal device shown in FIG. 1) communicatively connected to the executive subject.

In some optional implementations of this embodiment, the related information of the entity may include, but not limited to, at least one of: a title of the video characterized by the entity, a popularity data of the video characterized by the entity, and a authority cost information of the video characterized by the entity.

Wherein, the popularity data is used to characterize a degree of attention of the video characterized by the entity. The popularity data may be a numerical value, such as a view count, a number of hits, etc. The popularity data may also be other non-numerical data, for example, data characterizing the user's rating of the video (e.g., words such as "Good", "Medium", "Poor", etc.). As an example, when the popularity data is a numerical value, the higher the numerical value, the higher the characterized degree of attention of the video. The authority cost information may be used to characterize the cost paid by the user to be authorized to view the video characterized by the entity. The authority cost information may be numerical or other non-numerical information. As an example, the authority cost information may be a copyright price value of the video characterized by the entity. Alternatively, it may be an information which is calculated according to the copyright price of the video characterized by the entity and indicates the cost paid by the user. For example, when a ratio of the copyright price of a video A characterized by an entity to a single-day view count of the video A is larger than a first preset value, the authority cost information may be text information "high"; when the ratio of the copyright price of the video A characterized by the entity to the single-day view count of the video A is smaller than or equal to the first preset value and larger than a second preset value, the authority cost information may be text information "medium"; and when the ratio of the copyright price of the video A characterized by the entity to the single-day view count of the video A is smaller than the second preset value, the authority cost information may be text information "low".

In some optional implementations of this embodiment, the popularity data may include at least one of: a view count data of the video characterized by the entity, a follower count data of the video characterized by the entity and a comment count data of the video characterized by the entity. As an example, the view count data may be a view count data of the video characterized by the entity acquired by the executive subject from a web page indicated by a web address included in the attribute information of the entity. Optionally, the view count data may be an actual view count within a preset time period (e.g., the last day), or may be a ratio of the actual view count within the preset time period to a total view count of videos included in a website to which the web address belongs. The follower count data may be the number of users who record, follow, or collect or click on the video characterized by the entity on the web site. The comment count data may be the number of comments made by the user on the video characterized by the entity on the web site. It should be noted that the attribute information of the entity may include at least one web site, and accordingly, for each type of popularity data, the popularity data may be a summed result of popularity data obtained by the executive subject from the web pages indicated by the respective web address.

In some optional implementations of this embodiment, for the entity in the at least one entity, a view count data of a video characterized by the entity is acquired; in response to determining that the acquired view count data is greater than or equal to a preset view count threshold, a first prompt information is generated, and the related information, containing the first prompt information, of the entity is generated and output. Wherein, the first prompt information may be used to show the condition of the view count of the video characterized by the entity to the user. For example, the first prompt information may include the text "large view count". By outputting the first prompt information, the condition of the view count of the video authorized to the target authority owner can be shown to the user in a more intuitively way, so that the pertinence of information output can be improved.

Optionally, when the authority owner characterized by the acquired authority owner information is an authority owner which has not been authorized, the first prompt information may further include an information used to characterize that the video characterized by the entity is not authorized by the authority owner. For example, the first prompt information may include the text "unauthorized" to show the condition of authorization of the video characterized by the entity to the user.

In some optional implementations of this embodiment, in response to determining that the acquired view count data is smaller than the preset view count threshold, a second prompt information is generated, and the related information, containing the second prompt information, of the entity is generated and output. Wherein, the second prompt information may be used to show the condition of the view count of the video characterized by the entity to the user. For example, the second prompt information may include the text "low view count".

Optionally, when the authority owner characterized by the acquired authority owner information is an authority owner which has not been authorized, the second prompt information may further include an information used to characterize that the video characterized by the entity is not authorized by the authority owner. For example, the second prompt information may include the text "unauthorized".

It should be noted that the first prompt information and the second prompt information may take a form including, but not limited to, at least one of: words, numbers, symbols, images, audios, etc.

Figure 3:
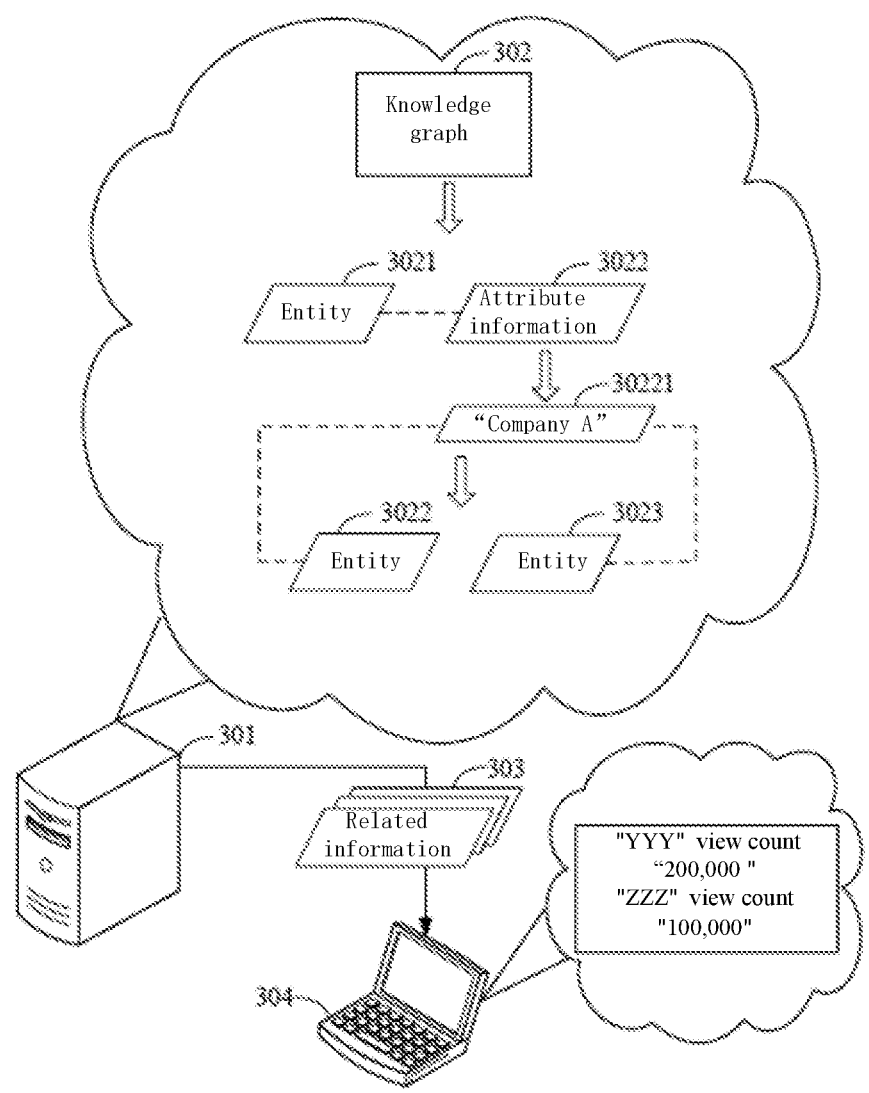
FIG. 3 is a schematic diagram of an application scenario of the method for outputting information according to an embodiment of the present application.

Still referring to FIG. 3, FIG. 3 is a schematic diagram of an application scenario of the method for outputting information according to this embodiment. In the application scenario of FIG. 3, the server 301 first searches for an entity 3021 characterizing a target video in the entities characterizing videos included in a knowledge graph 302 according to a search term "XXX Starring Li XX Movie" input by a technician. Wherein, the target video is the movie "XXX". Then, the server 301 acquires an authority owner information 30221 (e.g., the name of the authority owner "Company A") for characterizing an authority owner of the movie "XXX" from attribute information 3022 of the entity 3021. Then, the server 301 determines that the authority owner information 30221 is included in a preset authority owner information set, and determines that the authority owner characterized by the authority owner information 30221 is the target authority owner. Then, the server 301 determines an entity whose corresponding attribute information includes the authority owner information 30221 to be the entity associated with the authority owner information 30221 from entities characterizing videos in the knowledge graph 302, i.e. the entities 3022, 3023 in the figure. Finally, the server 301 generates related information 303 of the entities 3022, 3023 and outputs the generated related information to a terminal device 304 communicatively connected to the server for display. For example, a movie name "YYY" and a view count "200,000" characterized by the entity 3022, and a movie name "ZZZ" and a view count "100,000" characterized by the display entity 3023 are displayed on the terminal device 304.

According to the method provided by the above-mentioned embodiment of the present application, an entity characterizing a target video is determined from a pre-created knowledge graph, then an authority owner information for characterizing an authority owner of the target video is determined, thereafter, whether the authority owner is a target authority owner or not is determined, and if the authority owner is the target authority owner, at least one entity associated with the authority owner information is determined from the knowledge graph, and a related information of each entity in the at least one entity is generated and output, so that, based on the authority owner information, entities associated with the authority owner information can be accurately obtained, and the pertinence of information shown for the user can be improved.

Figure 4:
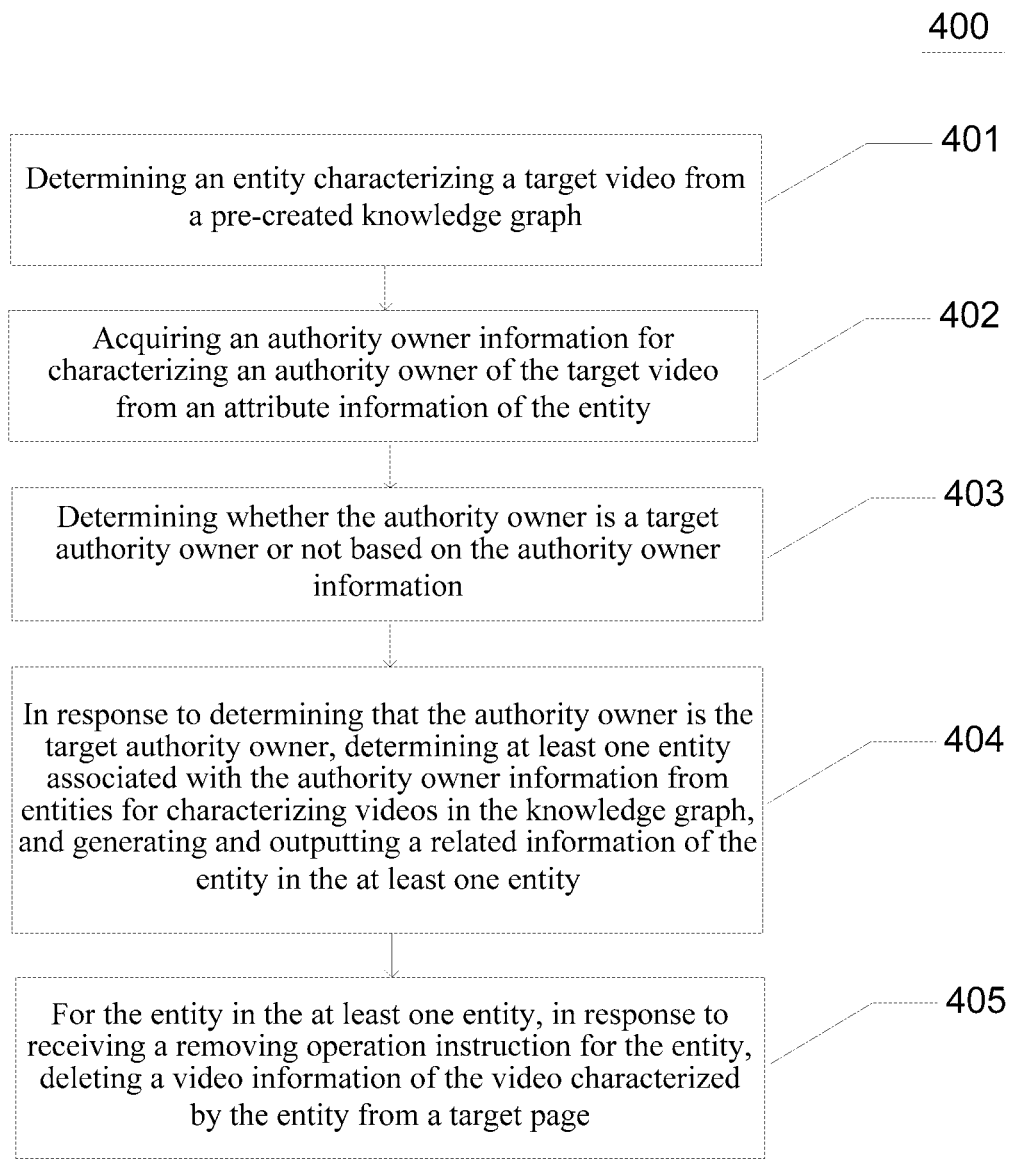
FIG. 4 is a flowchart of another embodiment of a method for outputting information according to an embodiment of the present application.

Further referring to FIG. 4, a process 400 of another embodiment of a method for outputting information is shown. The process 400 of the method for outputting information includes the following steps:

Step 401, an entity characterizing a target video is determined from a pre-created knowledge graph.

In this embodiment, step 401 is substantially identical to step 201 in the embodiment corresponding to FIG. 2 and will not be described in detail herein.

Step 402, an authority owner information for characterizing an authority owner of the target video is acquired from an attribute information of the entity.

In this embodiment, step 402 is substantially identical to step 202 in the embodiment corresponding to FIG. 2 and will not be described in detail herein.

Step 403, whether the authority owner is a target authority owner or not is determined based on the authority owner information.

In this embodiment, step 403 is substantially identical to step 203 in the embodiment corresponding to FIG. 2 and will not be described in detail herein.

Step 404, in response to determining that the authority owner is the target authority owner, at least one entity associated with the authority owner information is determined from entities for characterizing videos in the knowledge graph, and a related information of the entity in the at least one entity is generated and output.

In this embodiment, step 404 is substantially identical to step 204 in the embodiment corresponding to FIG. 2 and will not be described in detail herein.

Step 405, for the entity in the at least one entity, in response to receiving a removing operation instruction for the entity, a video information of the video characterized by the entity is deleted from a target page.

In the embodiment, for the entity in the at least one entity, the executive subject of the method for outputting information may in response to receiving a removing operation instruction for the entity, delete video information of the video characterized by the entity from a target page. Wherein, the target page is used to show the video information of the video characterized by the entity, and the target page may be a certain page specified in advance by a technician or a page in a certain page set (for example, pages included in a certain website). The removing operation instruction is generated by performing a removing operation through a target user terminal on the video characterized by the entity in the target page.

Specifically, the target user terminal may be a terminal used by the target user. The target user may be a user who has the authority to perform a removing operation on a video. As an example, the related information of an entity may be output to a target user terminal, and the target user may view the related information of the entity and decide whether to perform the removing operation on the video based on the information. For example, when the related information includes the popularity data and the target user judges that the popularity data is too low, the target user terminal may perform the removing operation by means of such as clicking, inputting a command, and the like, thereby generating a removing operation instruction and transmitting the removing operation instruction to the executive subject. The executive subject deletes the video information of the video characterized by the entity from the target page. As another example, the removing operation instruction may be generated when the target user terminal receives the related information of the entity and automatically executes the removing operation instruction according to the related information. For example, when the related information includes popularity data, the target user terminal may determine whether the popularity data is below a preset thermal threshold or not, and if the popularity data is below a preset thermal threshold, perform a download operation and generate a removing operation instruction.

In this embodiment, the video information of the video characterized by the entity may include, but not limited to, at least one of: the name, author, category, description information (e.g., profile information, rating information, etc.), image (e.g., a poster picture, a still), etc., of the video.

As can be seen from FIG. 4, compared with the embodiment corresponding to FIG. 2, the process 400 of the method for outputting information in this embodiment highlights the step of deleting the video information shown in the target page according to the received removing operation instruction. Therefore, according to the solution described by this embodiment of the invention, video information shown on the target page and related to the authority owner can be deleted according to the user's will, so that the video information can be shown on the target page more flexibly.

Figure 5:
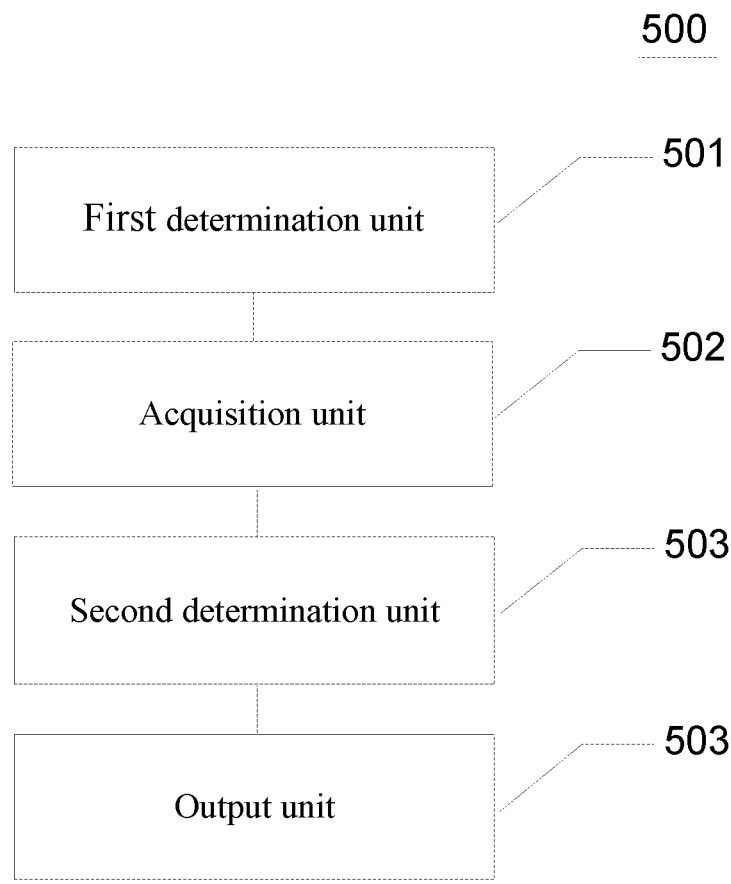
FIG. 5 is a structural schematic diagram of an embodiment of an apparatus for outputting information according to an embodiment of the present application.

Referring further to FIG. 5, as an implementation of the methods illustrated in the figures described above, the present application provides an embodiment of an apparatus for outputting information, corresponding to the method embodiment illustrated in FIG. 2, and the apparatus may be particularly applicable to various electronic devices.

As shown in FIG. 5, the apparatus 500 for outputting information of this embodiment includes: a first determination unit 501 configured to determine an entity characterizing a target video from a pre-created knowledge graph; an acquisition unit 502 configured to acquire an authority owner information for characterizing an authority owner of the target video from an attribute information of the entity; a second determination unit 503 configured to determine whether the authority owner is a target authority owner or not based on the authority owner information; and an output unit 504 configured to, in response to determining that the authority owner is the target authority owner, determine at least one entity associated with the authority owner information from entities for characterizing videos in the knowledge graph, and generate and output the related information of each entity in the at least one entity.

In this embodiment, the first determination unit 501 may determine an entity characterizing the target video from a pre-created knowledge graph. Wherein, the target video may be a video specified by a technician in advance. The pre-created knowledge graph may be stored in the apparatus 500 or in other electronic devices communicatively connected to the apparatus 500. In general, an entity in a knowledge graph may be used to characterize an object or concept (e.g., to characterize a person, location, time, information, etc.). The entity may take a form including at least one of: numbers, words, symbols, etc. In this embodiment, the knowledge graph may include entities for characterizing videos. As an example, an entity pre-created for characterizing a video may be "v-abc", wherein "v" indicates that the entity is used for characterizing a video, and "abc" is an identifier for characterizing the video. In addition, the knowledge graph of this embodiment may further include entities for characterizing other objects or concepts than videos. For example, an entity pre-created for characterizing a person may be "p-xyz", wherein "p" indicates that the entity is used for characterizing a person, and "xyz" is an identifier for characterizing the person.

The entity for characterizing a video described above may have a corresponding attribute information. The attribute information may be information related to the video characterized by the entity, and may include, but is not limited to, at least one of: video-related person (e.g., a producer, an actor, a director, etc. of the video) information, video-related time (e.g., a release time, a recording time, etc.) information, video source information (e.g., a play address of the video, a name of a website at which the video is located, etc.), and other information related with the content of the video (e.g., a profile, a still, a poster picture, etc.). In general, in a knowledge graph, a correspondence between an entity and an attribute information may be represented by a data structure in the form of a triplet, i.e. "entity-attribute-attribute value", wherein the attribute information of the entity may include the above-mentioned attribute-attribute value. For example, a triplet may be "abc123-name-XXX", wherein "abc123" is an entity for characterizing a movie "XXX", "name" is an attribute, and "XXX" is an attribute value.

In this embodiment, the first determination unit 501 may determine the target video information from the knowledge graph in various ways. As an example, the first determination unit 501 may match a search term (e.g. a name, a type, a release time, etc. of the target video) related to the target video input by a technician with text information included in the attribute information of each entity characterizing a video, and determine an entity corresponding to text information including the search term to be the target entity. Alternatively, the entity may have an identification information, and the first determination unit 501 may determine the entity characterizing the target video based on the identification information of the entity characterizing the target video specified by the technician.

In this embodiment, the acquisition unit 502 may acquire the authority owner information for characterizing the authority owner of the target video from the attribute information of the entity determined by the first determination unit 501. Wherein, the authority owner may be a unit or person owning a certain authority of the target video. The authority owner information may be used for characterizing the authority owner, and the authority owner information may take a form including, but not limited to, at least one of: characters, numbers, symbols, etc. For example, the authority owner information may be a name or code of the authority owner. In this embodiment, each piece of information included in the attribute information may have a corresponding identifier or number, and the acquisition unit 502 may acquire the authority owner information from the attribute information of the entity according to the identifier or number characterizing the authority owner information.

In this embodiment, the second determination unit 503 may determine whether the authority owner is a target authority owner or not based on the authority owner information obtained by the acquisition unit 502. As an example, the executive subject may match the acquired authority owner information with previously acquired target authority owner information characterizing the target authority owner, and if the acquired authority owner information is identical to the target authority owner information, it is determined that the authority owner characterized by the acquired authority owner information is the target authority owner.

In this embodiment, the output unit 504 may, in response to determining that the authority owner is a target authority owner, determine at least one entity associated with the acquired authority owner information from entities for characterizing videos in the knowledge graph. As an example, the entity associated with the acquired authority owner information may be an entity whose corresponding attribute information includes the acquired authority owner information, and the output unit 504 may determine the attribute information including the acquired authority owner information from attribute information of each entity characterizing a video, thereby determining at least one entity associated with the acquired authority owner information.

Then, the output unit 504 may generate a related information of the entity in the determined at least one entity and output the respective related information. Wherein, the related information may be an information included in the attribute information of the entity or other information related to the entity (e.g. pre-acquired users' comments, scores and the like for the video characterized by the entity). As an example, the attribute information may include various types of sub information, which may have corresponding identifiers or serial numbers to distinct categories of the sub information. The executive subject may extract sub information of a preset category from the attribute information as related information.

In some optional implementations of this embodiment, the second determination unit 503 includes: a first determination module (not shown in the figure) configured to determine whether the authority owner information is included in an pre-created authority owner information set or not; and a second determination module (not shown in the figure) configured to, in response to determining the authority owner information is included in the pre-created authority owner information set, determine that the authority owner is the target authority owner.

In some optional implementations of this embodiment, the output unit 504 is further configured to: for the entity in the at least one entity, acquire a view count data of a video characterized by the entity, wherein the view count data is a numerical value; and in response to determining that the acquired view count data is greater than or equal to a preset view count threshold, generate a first prompt information, and generate and output the related information, containing the first prompt information, of the entity.

In some optional implementations of this embodiment, the output unit 504 is further configured to: in response to determining that the acquired view count data is smaller than the preset view count threshold, generate a second prompt information, and generate and output the related information, containing the second prompt information, of the entity.

In some alternative implementations of this embodiment, the related information of the entity includes at least one of: a title of the video characterized by the entity, a popularity data of the video characterized by the entity, and an authority cost information of the video characterized by the entity.

In some optional implementations of this embodiment, the popularity data includes at least one of: a view count data of the video characterized by the entity, a follower count data of the video characterized by the entity and a comment count data of the video characterized by the entity.

In some optional implementations of this embodiment, the apparatus further includes: a delete unit (not shown in the figure) configured to, for each entity in the at least one entity, in response to receiving a removing operation instruction for the entity, delete a video information of the video characterized by the entity from a target page, wherein the target page is used for showing the video information of the video characterized by the entity, and the removing operation instruction is generated by performing a removing operation through a target user terminal on the video characterized by the entity in the target page.

According to the apparatus provided by the embodiment of the present application, an entity characterizing a target video is determined from a pre-created knowledge graph, then authority owner information for characterizing an authority owner of the target video is determined, thereafter, whether the authority owner is a target authority owner or not is determined, and if the authority owner is the target authority owner, at least one entity associated with the authority owner information is determined from the knowledge graph, and a related information of the entity in the at least one entity is generate and output, so that, based on the authority owner information, entities associated with the authority owner information can be accurately obtained, and the pertinence of information shown for the user can be improved.

Figure 6:
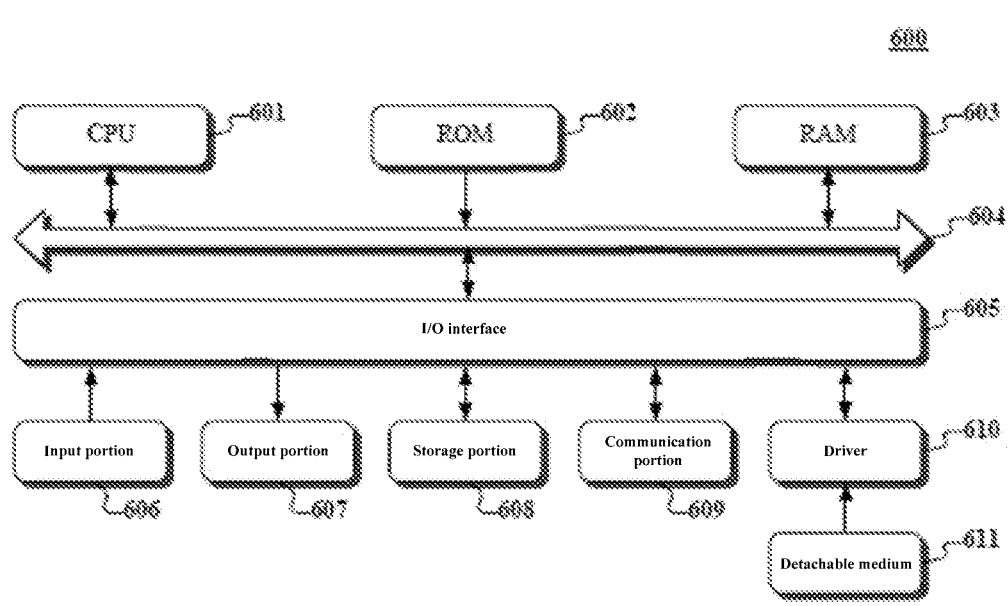
FIG. 6 is a structural schematic diagram of a computer system of a server suitable for implementing an embodiment of the present application.

Refer to FIG. 6 below, which shows a schematic structural diagram of a computer system 600 suitable for implementing the server of the embodiment of the present application. The server shown in FIG. 6 is only an example, and should not bring any limitation to the functions and usage scope of the embodiments of the present application.

As shown in FIG. 6, the computer system 600 comprises a central processing unit (CPU) 601 which can execute various appropriate actions and processes according to programs stored in a read-only memory (ROM) 602 or programs loaded to a random-access memory (RAM) 603 from a storage portion 608. Various programs and data required by operation of the system 600 are also stored in the RAM 603. The CPU 601, ROM 602 and RAM 603 are connected to one another through a bus 604. An input/output (I/O) interface 605 is also connected to the bus 604.

The I/O interface 605 is connected with following components: an input portion 606 including a keyboard, a mouse, etc; an output portion 607 including a cathode-ray tube (CRT), a liquid crystal display (LCD), a loudspeaker, etc; a storage portion 608 including a hard disk, etc; and a communication portion 609 including a network interface card such as an LAN card and a modem. The communication portion 609 executes communication through networks such as the Internet. A driver 610 is also connected to the I/O interface 605 as required. A detachable medium 611, such as a magnetic disk, an optical disk, a magneto-optical disk and a semiconductor memory, is installed on the driver 610 as required, so that computer programs read from the detachable medium can be installed into the storage portion 608 as required.

Specifically, processes described above with reference to flowcharts may be implemented as computer software programs in accordance with embodiments of the present disclosure. For example, an embodiment of the present application comprises a computer program product which comprises a computer program carried on a computer readable medium, and the computer program comprises program codes used for executing the method shown in the flowchart. In such embodiment, the computer program may be downloaded from the network through the communication portion 609 and installed, and/or downloaded from the detachable medium 611 and installed. When the computer program is executed by the central processing unit (CPU) 601, a function defined in the method provided by the present application is executed.

It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present application, the computer readable storage medium may be any tangible medium that contains or stores a program that can be used by or in combination with an instruction execution system, apparatus, or device. In the present application, a computer readable signal medium may include a data signal propagating in a baseband or as a part of a carrier wave, wherein computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The computer program codes for carrying out operation of the present application may be written by one or more programming languages, or a combination thereof, the programming languages include object oriented programming languages, such as Java, Smalltalk, C++, as well as conventional procedural programming languages, such as a "C" language or similar programming languages. The program codes may be executed entirely on a user computer, or partly on the user computer, or as a separate software package, or partly on the user computer and partly on a remote computer, or entirely on the remote computer or the server. In situations involving the remote computer, the remote computer may be connected to the user computer through any kind of network, including a local area network (LAN) or a wide area network (WAN), or may be connected to an external computer (for example through the Internet by virtue of an Internet service provider).

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present application may be implemented in a software mode or in a hardware mode. The described units may also be arranged in a processor, for example, the units can be described as follows: a processor comprises a first determination unit, an acquisition unit, a second determination unit and an output unit, wherein the names of the units do not, in some cases, constitute limitation on the units themselves. The first determine unit can also be described as "a unit to determine an entity characterizing a target video from a pre-created knowledge graph".

In another aspect, the present application also provides a computer readable medium which may be included in the electronic equipment described in the above embodiments, or may also present separately without being assembled into the electronic device. The above computer readable medium carries one or more programs. When the above one or more programs are executed by the server, the server: determine an entity characterizing a target video from a pre-created knowledge graph; acquire an authority owner information for characterizing an authority owner of the target video from an attribute information of the entity; determine whether the authority owner is a target authority owner or not based on the authority owner information; and in response to determining that the authority owner is the target authority owner, determine at least one entity associated with the authority owner information from entities for characterizing videos in the knowledge graph, and generate and output a related information of the entity in the at least one entity.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present disclosure.

The invention claimed is:

1. A method for outputting information, comprising:
   determining an entity characterizing a target video from a pre-created knowledge graph with nodes representing entities and edges representing semantic relations between the entities, wherein the entities in the pre-created knowledge graph characterize videos;
   acquiring owner information characterizing an owner of the target video from attribute information of the entity, wherein the owner information comprises authorization information indicating whether the owner of the target video characterized by the entity has been authorized copyright as an authority owner;
   determining whether the owner is a target authority owner or not by determining whether the owner of the target video has been authorized or not based on the authority owner information;
   in response to determining that the owner is the target authority owner, determining at least one entity associated with the owner information from the entities characterizing the videos in the pre-created knowledge graph; and
   generating and outputting related information of the at least one entity, wherein the related information comprises authority cost information of at least one video characterized by the at least one entity, wherein the authority cost information is associated with a copyright price of the at least one video characterized by the at least one entity, and wherein the generating and outputting related information further comprises generating and outputting a prompt information indicative of an authorization status of the at least one video characterized by the at least one entity.

2. The method of claim 1, wherein the determining whether the authority owner is a target authority owner or not based on the authority owner information comprises:
   determining whether the authority owner information is included in a pre-created authority owner information set or not; and
   in response to determining the authority owner information is included in the pre-created authority owner information set, determining that the authority owner is the target authority owner.

3. The method of claim 2, wherein after the generating and outputting a related information of the entity in the at least one entity, the method further comprises:
   for the entity in the at least one entity, in response to receiving a removing operation instruction for the entity, deleting a video information of the video characterized by the entity from a target page, wherein the target page is used for showing the video information of the video characterized by the entity, and the removing operation instruction is generated by performing a removing operation through a target user terminal on the video characterized by the entity in the target page.

4. The method of claim 1, wherein the generating and outputting a related information of the entity in the at least one entity comprises:
   for the entity in the at least one entity, acquiring a view count data of a video characterized by the entity, wherein the view count data is a numerical value; and
   in response to determining that the acquired view count data is greater than or equal to a preset view count threshold, generating a first prompt information, and generating and outputting the related information, containing the first prompt information, of the entity.

5. The method of claim 4, wherein after the acquiring a view count data of a video characterized by the entity, the method further comprises:
   in response to determining that the acquired view count data is smaller than the preset view count threshold, generating a second prompt information, and generating and outputting the related information, containing the second prompt information, of the entity.

6. The method of claim 4, wherein after the generating and outputting a related information of the entity in the at least one entity, the method further comprises:
   for the entity in the at least one entity, in response to receiving a removing operation instruction for the entity, deleting a video information of the video characterized by the entity from a target page, wherein the target page is used for showing the video information of the video characterized by the entity, and the removing operation instruction is generated by performing a removing operation through a target user terminal on the video characterized by the entity in the target page.

7. The method of claim 1, wherein the related information of the entity further comprises at least one of a title of the video characterized by the entity or a popularity data of the video characterized by the entity.

8. The method of claim 7, wherein the popularity data comprises at least one of:
   a view count data of the video characterized by the entity, a follower count data of the video characterized by the entity, and a comment count data of the video characterized by the entity.

9. the method of claim 7, wherein after the generating and outputting a related information of the entity in the at least one entity, the method further comprises:
   for the entity in the at least one entity, in response to receiving a removing operation instruction for the entity, deleting a video information of the video characterized by the entity from a target page, wherein the target page is used for showing the video information of the video characterized by the entity, and the removing operation instruction is generated by performing a removing operation through a target user terminal on the video characterized by the entity in the target page.

10. The method of claim 1, wherein after the generating and outputting a related information of the entity in the at least one entity, the method further comprises:
    for the entity in the at least one entity, in response to receiving a removing operation instruction for the entity, deleting a video information of the video characterized by the entity from a target page, wherein the target page is used for showing the video information of the video characterized by the entity, and the removing operation instruction is generated by performing a removing operation through a target user terminal on the video characterized by the entity in the target page.

11. An apparatus for outputting information, comprising:
at least one processor; and
at least one memory communicatively coupled to the at least one processor and storing instructions that upon execution by the at least one processor cause the apparatus to:
determine an entity characterizing a target video from a pre-created knowledge graph with nodes representing entities and edges representing semantic relations between the entities, wherein the entities in the pre-created knowledge graph characterize videos;
acquire owner information characterizing an owner of the target video from attribute information of the entity, wherein the owner information comprises authorization information indicating whether the owner of the target video characterized by the entity has been authorized copyright as an authority owner,
determine whether the owner is a target authority owner or not by determining whether the owner of the target video has been authorized or not based on the owner information;
in response to determining that the owner is the target authority owner, determine at least one entity associated with the owner information from the entities characterizing the videos in the pre-created knowledge graph; and
generating and outputting related information of each entity in the at least one entity, wherein the related information of each entity comprises authority cost information of a video characterized by each entity, wherein the authority cost information is associated with a copyright price of the video characterized by each entity, and wherein the generating and outputting related information further comprises generating and outputting a prompt information indicative of an authorization status of the video characterized by each entity.

12. The apparatus of claim 11, wherein the at least one memory further stores instructions that upon execution by the at least one processor cause the apparatus to:
determine whether the authority owner information is included in a pre-created authority owner information set or not; and
in response to determining the authority owner information is included in the pre-created authority owner information set, determine that the authority owner is the target authority owner.

13. The apparatus of claim 12, wherein the at least one memory further stores instructions that upon execution by the at least one processor cause the apparatus to:
for the entity in the at least one entity, in response to receiving a removing operation instruction for the entity, delete a video information of the video characterized by the entity from a target page, wherein the target page is used for showing the video information of the video characterized by the entity, and the removing operation instruction is generated by performing a removing operation through a target user terminal on the video characterized by the entity in the target page.

14. The apparatus of claim 11, wherein the at least one memory further stores instructions that upon execution by the at least one processor cause the apparatus to:
for the entity in the at least one entity, acquire view count data of a video characterized by the entity, wherein the view count data is a numerical value; and in response to determining that the acquired view count data is greater than or equal to a preset view count threshold, generate a first prompt information, and generate and output the related information, containing the first prompt information, of the entity.

15. The apparatus of claim 14, wherein the at least one memory further stores instructions that upon execution by the at least one processor cause the apparatus to:
in response to determining that the acquired view count data is smaller than the preset view count threshold, generate a second prompt information, and generate and output the related information, containing the second prompt information, of the entity.

16. The apparatus of claim 14, wherein the at least one memory further stores instructions that upon execution by the at least one processor cause the apparatus to:
for the entity in the at least one entity, in response to receiving a removing operation instruction for the entity, delete a video information of the video characterized by the entity from a target page, wherein the target page is used for showing the video information of the video characterized by the entity, and the removing operation instruction is generated by performing a removing operation through a target user terminal on the video characterized by the entity in the target page.

17. The apparatus of claim 11, wherein the related information of the entity further comprises at least one of a title of the video characterized by the entity or a popularity data of the video characterized by the entity.

18. The apparatus of claim 17, wherein the popularity data comprises at least one of:
a view count data of the video characterized by the entity, a follower count data of the video characterized by the entity, and a comment count data of the video characterized by the entity.

19. The apparatus of claim 11, wherein the at least one memory further stores instructions that upon execution by the at least one processor cause the apparatus to:
for the entity in the at least one entity, in response to receiving a removing operation instruction for the entity, delete a video information of the video characterized by the entity from a target page, wherein the target page is used for showing the video information of the video characterized by the entity, and the removing operation instruction is generated by performing a removing operation through a target user terminal on the video characterized by the entity in the target page.

20. A non-transitory computer readable storage medium, storing a computer program, configured to perform operations when the computer program is executed by a processor, the operations comprising:
determining an entity characterizing a target video from a pre-created knowledge graph with nodes representing entities and edges representing semantic relations between the entities, wherein the entities in the pre-created knowledge graph characterize videos;
acquiring owner information characterizing an owner of the target video from attribute information of the entity, wherein the owner information comprises authorization information indicating whether the owner of the target video characterized by the entity has been authorized copyright as an authority owner;
determining whether the owner is a target authority owner or not by determining whether the owner of the target video has been authorized or not based on the owner information;
in response to determining that the owner is the target authority owner, determining at least one entity associated with the owner information from the entities characterizing the videos in the pre-created knowledge graph; and generating and outputting related information of the at least one entity, wherein the related information comprises authority cost information of at least one video characterized by the at least one entity, wherein the authority cost information is associated with a copyright price of the at least one video characterized by the at least one entity, and wherein the generating and outputting related information further comprises generating and outputting a prompt information indicative of an authorization status of the at least one video characterized by the at least one entity.

\* \* \* \* \*